Feb. 19, 1952     A. J. BJERKAN     2,585,992
PLANTER MARKER

Filed Feb. 19, 1948     2 SHEETS—SHEET 1

INVENTOR.
ARTHUR J. BJERKAN
BY
ATTORNEYS

Feb. 19, 1952 A. J. BJERKAN 2,585,992
PLANTER MARKER

Filed Feb. 19, 1948 2 SHEETS—SHEET 2

INVENTOR.
ARTHUR J. BJERKAN
BY
ATTORNEYS

Patented Feb. 19, 1952

2,585,992

UNITED STATES PATENT OFFICE 2,585,992

PLANTER MARKER

Arthur J. Bjerkan, Moline, Ill., assignor to Deere & Company, Moline, Ill., a corporation of Illinois Application February 19, 1948, Serial No. 9,441

11 Claims. (Cl. 97—230)

The present invention relates generally to agricultural implements and is more particularly concerned with new and useful improvements in planters and similar implements.

The object and general nature of the present invention is the provision of a plating implement having new and improved control means for controlling the markers and the mechanism for raising and lowering the furrow opening units. More specifically, it is an important feature of this invention to provide a single control member having movement in one direction for controlling the markers and movement in another direction for controlling the furrow opener raising and lowering means.

These and other objects and advantages of the invention will be apparent to those skilled in the art after a consideration of the following detailed description, taken in conjunction with the accompanying drawings in which.

Figure 1:
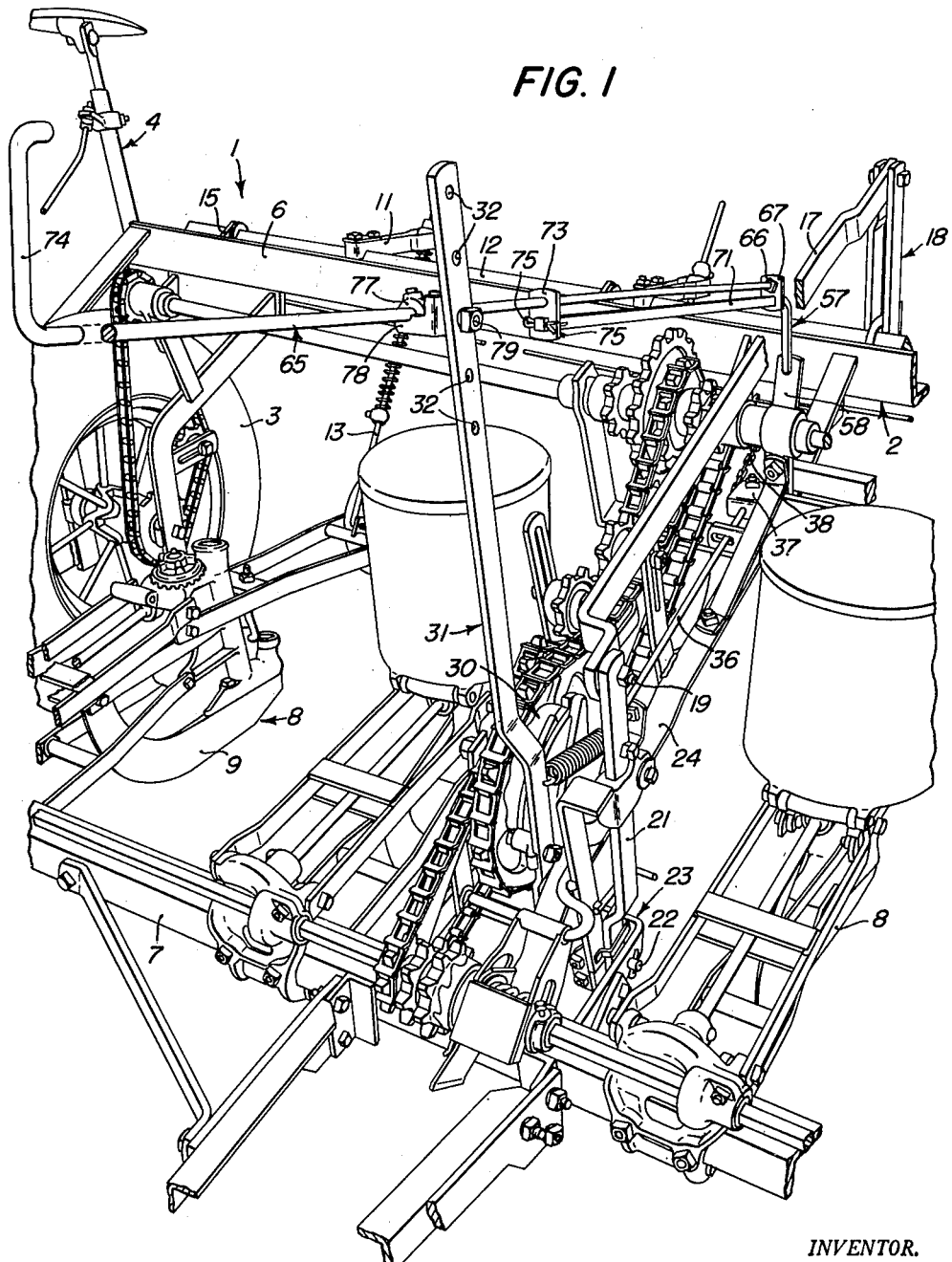
Figure 1 is a perspective of a planter in which the principles of the present invention have been incorporated.

Referring now more particularly to the drawings, I have shown the present invention as embodied in a tractor drawn planter of the four-row type, indicated in its entirety by the reference numeral 1. The planter is generally similar to that shown in the United States Patent 2,376,464 to C. H. White, dated May 22, 1945, and includes a planter frame 2 supported on ground wheels 3 and having marker arms 4 which are pivoted at the lower ends of brackets 5 fixed to the rear frame bar 6 of the planter. Pivotally connected to the front frame bar 7 of the planter is a plurality of furrow opener units 8, which per se are of conventional construction. The planting units 8, each of which includes a furrow opener 9, are raised and lowered by means of a plurality of arms 11 fixed to a rockshaft 12 mounted on the rear frame angle 6 and connected through connecting rods 13 to the rear ends of the associated planting units 8. The rockshaft 12 is mounted on the planter frame by means of end brackets 15, and the rockshaft 12 is operated by means of a fore and aft extending link 17 which is connected at its rear end to an arm 18 fixed to the rockshaft 12, the forward end of the link 17 being pivotally connected, at 19, to the upper end of a fore and aft swingable member 21 that is pivotally mounted, as at 22, on the planter frame by means of a bracket 23 carried by fore and aft cross braces 24. The member 21 is operated by a self-interrupting clutch unit, indicated in its entirety by the reference numeral 30, the details of which per se form no part of the present invention, being shown and claimed in the aforesaid White Patent 2,376,464. The unit 30 is controlled by a trip lever 31 which, according to the present invention, is extended upwardly for a considerable distance and is provided with a plurality of openings 32, for a purpose which will be referred to later. The clutch unit 30 is driven through suitable means from the ground wheels 3 and when the trip lever 31 is moved forwardly, motion is imparted to the arm 21 to swing the same forwardly, such motion being transmitted through the link 17 to the arm 18, which rocks the shaft 12 in a direction to raise the rear ends of the planting units 8.

The forward movement of the power lift clutch operated member 21 is also made use of for raising both the markers 4 into their raised position. A connection for this purpose is established through a link 36 which is connected at its forward end to the arm 21 and at its rear end is connected to a yoke 37 to which the inner ends of a pair of lifting chains 38 are connected. The inner portions of these chains are trained over a pair of pulleys 41 mounted for rotation on a plate 42 carried by a bracket 43 fixed to the rear frame angle 6, generally in the central portion of the frame. The outer ends of the chains 38 are connected, respectively, to the marker arms 4, passing over sheaves 40 fixed to brace members 44 which form part of the depending brackets 5. The outermost end of each of the chains 38 is connected to the associated marker arm 4 through a bracket 45 one end of which is formed as a hook portion 46 with which a latch 47 cooperates. Each of the latches 47 is pivoted to an angle bracket 48 carried by the associated bracket 5, and the parts are so constructed and arranged that when the arm 21 is swung forwardly, a pull is exerted through the rod 36, the chains 38 and the brackets 45 to swing both of the marker arms upwardly into a transport position, in which each of the latches 47 engages in the notch in the hook 46 on the associated marker arm. Suitable spring means 49 urges the latches 47 into marker arm engaging position, and for disengaging the latches 47, to permit the selected marker arm to fall into marking or operative position, I provide a pair of laterally inwardly extending control rods 51, each connected at its outer end to the associated marker arm latch 47. Secured to the inner end of each of the latch control rods 51 is a slotted member 53, one end of which is bent and apertured, as at 54, to receive the associated control rod 51. Preferably, the inner end of each of the latter is threaded to receive a pair of lock nuts 55, by means of which the position of the associated slotted member 53 may be adjusted.

Figure 2:
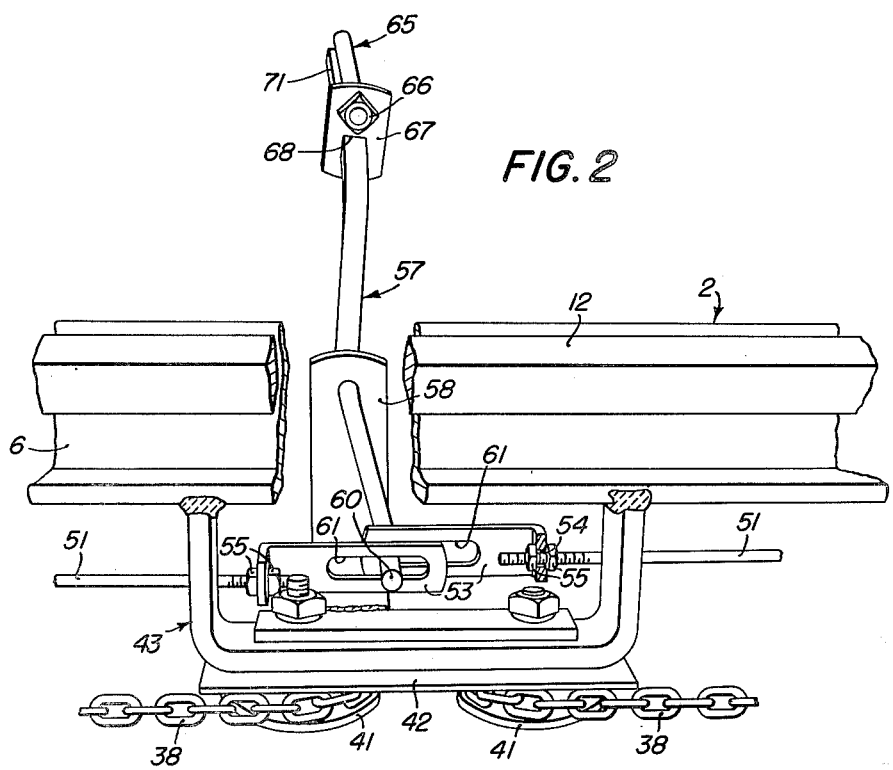
Figure 2 is an enlarged fragmentary perspective showing the details of the marker control arm support and the connections between the control arm and the latch rods.
Figure 3:
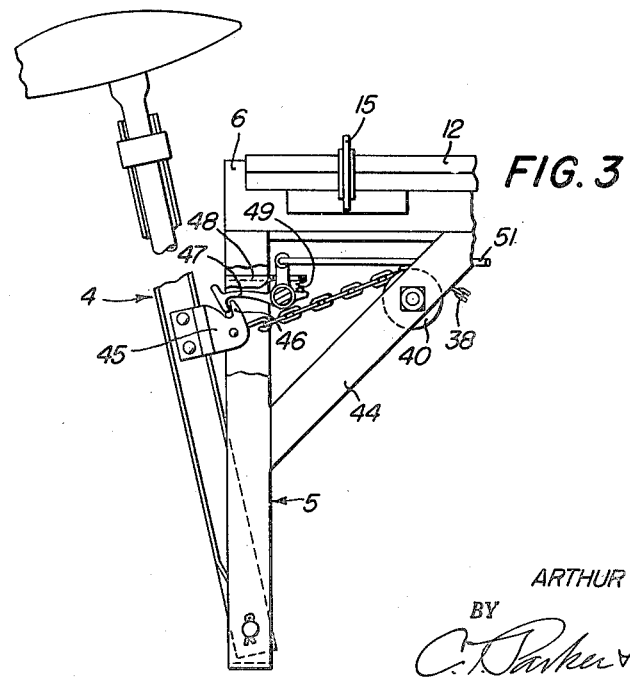
Figure 3 is a detail view showing the marker arm mounting.

The members 53 are arranged in overlapping relation so that, as best shown in Figure 2, a common control arm 57 may be arranged to operate either one of the control rods 51 as desired. The latch control member 57 is swingably mounted on a bracket 58 fixed in any suitable manner on the planter frame, preferably by having its base leg secured to the bracket 43 by the same bolts that secure the bearing bushings for the sheaves 41 to the bracket 43. The lower end of the member 57 is extended rearwardly, as at 60, and passes through the slots 61 in the members 53. Only the innermost portions of the members 53 are overlapped, just sufficient to receive the extension 60. Therefore, when the member 57 is rocked in one direction, a pull is exerted through one of the control rods 51 to release the associated marker arm latch, the other control rod and latch not being affected since the extension 60 merely moves outwardly in the slot 61 in the companion member 53. Thus, by rocking the member 57 in one direction or the other (the arm 57 is shown as rocked a small amount to the right to carry the lower end leftward, as viewed in Figure 2), one or the other of the marker arm latches will be released so as to drop one or the other of the markers. However, whenever the power lift clutch unit 30 is operated to raise the furrow opening or planter units, the resulting forward movement of the rod 36 serves to exert a pull through one or the other of the chains 38 to raise the marker that was in a lowered or marking position. Ordinarily both markers are never down at the same time.

Associated with the marker latch controlling member 57 is an operating rod 65 which is also utilized for controlling the trip lever 31. The rear end of the rod 65 is threaded to receive a pair of lock nuts 66 by which a clip 67 is fixed to the rear end of the rod 65. The clip 67 is provided with a polygonal opening 68 to fit on a forwardly extending section 71 of the marker control member 57. Preferably, the extension 71 is also polygonal in cross section and, the clip 67 being rigidly fixed to the rear end of the rod 65, rocking the latter in one direction or the other serves to rock the latch control member 57. However, the clip 67 may be shifted forwardly along the extension 71, whereby the rod 65 may be moved back and forth relative to the member 57. This movement of the rod 65 relative to the member 57 is guided by a front clip 73 which has an opening to slidably receive the rod 65 and is fixed rigidly, as by a pair of cotters 75, to the forward end of the latch control arm extension 71. The forward end of the rod 65 is provided with an upwardly bent handle section 74 supplied for rocking the rod 65 and the control member 57, and also for shifting the rod 65 forwardly relative to the control member 57 and its forwardly disposed extension 71.

The fore and aft movement of the rod 65, just referred to, is made use of for controlling the clutch trip member 31. To this end, an abutment 77, preferably in the form of a set screw collar or the like, is fixed to the rod 65 and is disposed between the front and rear portions of a yoke 78 that is pivoted, as by a bolt 79, in one or the other of the openings 32 in the trip lever 31. The mounting of the control member 57 in the upper end of the bracket 58 is sufficiently loose to accommodate a certain amount of vertical swinging or rocking action, whereby to accommodate the fore and aft swinging of the trip lever 31, and the mounting of the rod 65 and collar 77 in the yoke 78 is sufficiently loose to accommodate the rotation of the members 57 and 71 generally about an axis passing through the upper portion of the bracket 58 and the yoke 78.

By virtue of the combined lift clutch and marker arm control, the operator on the tractor may conveniently pull the rod 65 forwardly to engage the clutch 30 and lift the planter units 8, whereby the outfit is arranged for transport, as at the end of a field, and then after the turn is made and the outfit is ready to plant, the operator again pulls forwardly on the rod 65 to trip the clutch unit 30 to permit the units 8 to drop into planting position. At the same time the operator may rock the rod 65 in one direction or the other to cause one or the other of the marker arms to drop into marking position, or he may wait for a time before dropping one or the other of the markers if that is required or desirable in view of the terrain or other conditions. If in operation the outfit crosses over a grassed waterway or other portion of the field at which it is desired momentarily to raise the tools but without changing the markers, all the operator has to do is to pull the rod 65 once to raise the tools 8 and then again to lower the tools and then rock the rod 65 to release the latch of the marker arm he desires to lower.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. For use in a planter having a pair of marker arms, each having a latch for holding the associated marker arm in a raised position, the improvement comprising marker control mechanism including a pair of connections extending laterally inwardly from said latches and having inner slotted portions lying in overlapping relation, and an operating part shiftable generally transversely relative to said connections and having an extension extending through both of said slotted portions whereby said part may be shifted in one direction to operate one of said latches and in the other direction to operate the other latch.

2. For use in a planter having a laterally disposed frame, a marker arm pivotally connected at its inner end to each end of said frame, the improvement comprising marker control means including latch means mounted on each end of said frame and engageable with a portion of the associated marker arm for holding the latter in a raised position, a latch operating rod connected with each latch means and extending laterally inwardly to the generally central portion of said frame, overlapping slotted members connected, respectively, to the laterally inner ends of said rods, and a manually controlled arm pivotally mounted on the generally central portion of said frame and including an extension disposed in the slots in said members whereby moving said arm in one direction operates one latch and moving the arm in the other direction operates the other latch.

3. For use in a planter having a laterally disposed frame, a marker arm pivotally connected at its inner end to each end of said frame, latch means mounted on each end of said frame and engageable with a portion of the associated marker arm for holding the latter in a raised position, marker raising means carried by said frame and connected with said marker arms, and a controller for controlling the operation of said marker raising means, the improvement comprising control mechanism including a latch operating rod connected with each latch means and extending laterally inwardly to the generally central portion of said frame, overlapping slotted members connected, respectively, to the laterally inner ends of said rods, a manually controlled arm pivotally mounted on the generally central portion of said frame and including an extension disposed in the slots in said members whereby moving said arm in one direction operates one latch and moving the arm in the other direction operates the other latch, a part having a slidable but non-rotatable connection with said arm, whereby said part may be rocked laterally to operate said arm or may be shifted slidably along said arm, and a connection between said part and said controller operative by virtue of said shiftable movement of said part relative to said arm for controlling the operation of said marker raising means.

4. In a planter, the combination of latch control means comprising a member shiftable generally in a lateral direction for controlling said latch means, a part having a non-rotatable but slidable connection with said member, rocking said part serving to shift said member laterally, a controllable unit on said planter, and a connection between said unit and said part including means establishing a rotatable but non-slidable connection with said part whereby sliding movement of the latter relative to said latch control member serves to control said unit.

5. In a planter having marker arm latch means and lift clutch mechanism, the combination of latch control means comprising a member shiftable generally in a lateral direction for controlling said latch means, a part having a non-rotatable but slidable connection with said member, rocking said part serving to shift said member laterally, control means for said planter clutch mechanism including a lever shiftably mounted on said planter for movement in a generally fore and aft direction, and abutment means on said part operatively connected with said lever whereby fore and aft movement of said slidable part serves to shift said lever in a generally fore and aft direction, said abutment means being rotatable relative to said lever so as to accommodate rocking movement of said part for controlling said latch means.

6. In a planter including a frame and a pair of marker arms pivotally connected with opposite ends of said frame, the combination of a member mounted on said frame for lateral movement, connections between said member operative by lateral movement thereof for controlling said marker arms, an operating part connected with said member for shifting the same laterally, said part being slidable in a generally fore and aft direction relative to said member, operating means including a lever mounted on said frame for generally fore and aft movement relative thereto, abutment means carried by said operating part and fixed thereto against fore and aft displacement, and a connection between said lever and said abutment means whereby fore and aft movement of said operating part relative to said member serves to shift said lever in a generally fore and aft direction, said abutment means being rotatable relative to said lever to accommodate operation of said part to shift said marker arm control member laterally.

7. In a planter, a frame, a pair of marker arms pivotally connected at opposite ends of said frame and swingable downwardly relative thereto into a marking position, a bracket on the rear central portion of said frame, an arm swingably mounted on said bracket and having an end shiftable generally laterally, connections between said end of said arm and said marker arms for controlling the latter, an operating unit mounted on said frame generally adjacent the forward portion thereof and including a fore and aft generally vertically extending lever, a generally fore and aft extending rod member mounted on said lever and including means connecting the rod and lever whereby fore and aft movement of said rod serves to operate said lever, connections between the rear end portion of said rod and said laterally swingable arm whereby said rod is mounted for relatively free movement relative to said marker controlling arm in a generally fore and aft direction but rocking movement of said rod serving to transmit rocking movement to said arm, said rear portion of said rod being supported on said arm.

8. The invention set forth in claim 7, further characterized by said arm having a forwardly extending portion, a clip fixed to the rear end of said rod and having a slidable non-rotatable connection with the forwardly extending portions of said member, the forward end of the latter carrying a clip receiving said rod and through which said rod is generally slidable relative to said forwardly extending portion.

9. For use in a planter having a frame, a pair of marker arms pivotally connected at opposite ends of said frame and swingable downwardly relative thereto into a marking position, and an operating unit mounted on said frame generally adjacent the forward portion thereof and including a fore and aft generally vertically extending lever; the improvement comprising a bracket adapted to be mounted on the rear central portion of said frame, an arm swingably mounted on said bracket and having an end shiftable generally laterally, connections between said end of said arm and said marker arms for controlling the latter, a generally fore and aft extending rod member adapted to be mounted on said lever and including means connecting the rod and lever whereby fore and aft movement of said rod serves to operate said lever, connections between the rear end portion of said rod and said laterally swingable arm whereby said rod is mounted for relatively free movement relative to said marker controlling arm in a generally fore and aft direction but rocking movement of said rod serving to transmit rocking movement to said arm, said rear portion of said rod being supported on said arm.

10. For use in a planter having a frame, a pair of marker arms pivotally connected at opposite ends of said frame and swingable downwardly relative thereto into a marking position, and an operating unit mounted on said frame generally adjacent the forward portion thereof and including a fore and aft generally vertically extending lever: the improvement comprising a bracket adapted to be mounted on the rear central portion of said frame, an arm swingably mounted on said bracket and having an end shiftable generally laterally, connections between said end of said arm and said marker arms for controlling the latter, a generally fore and aft extending rod member, said arm having a forwardly extending portion, a clip fixed to the rear end of said rod and having a slidable non-rotatable connection with the forwardly extending portion of said arm, the forward end of the latter carrying a clip receiving said rod and through which said rod is generally slidable relative to said forwardly extending portion, and means connecting the rod and lever whereby fore and aft movement of said rod serves to operate said lever.

11. In apparatus including a frame and a pair of operating means connected therewith, control means comprising an arm adapted to be swingably mounted on said frame and including a polygonal portion, means for connecting said arm with one of said operating means, a part having a slidable but non-rotatable connection with said polygonal portion, a rod member fixed at one end to said part, a second part fixed to the end of said polygonal portion and apertured to slidably receive said rod member, the other end of the latter having a handle section, and means having a rotatable connection with said rod member and connecting the latter with the other of said operating means so as to operate the latter by sliding movement of said rod member relative to said swingably mounted arm.

ARTHUR J. BJERKAN.

REFERENCES CITED

The following references are of record in the file of this patent:

UNITED STATES PATENTS

| Number | Name | Date |
|---|---|---|
| 1,611,236 | Rodgers | Dec. 21, 1926 |
| 1,888,502 | Holstein | Nov. 22, 1932 |
| 1,911,218 | White | May 30, 1933 |
| 2,376,464 | White | May 22, 1945 |